United States Patent
Farrington (10) Patent No.: US 7,596,109 B1
(45) Date of Patent: Sep. 29, 2009

(54) DISRUPTING AN AD-HOC WIRELESS NETWORK

(75) Inventor: Ricardo Tomas Farrington, Campbell, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 351 days.

(21) Appl. No.: 11/303,691

(22) Filed: Dec. 16, 2005

(51) Int. Cl.
*H04H 20/71* (2008.01)
*H04M 11/10* (2006.01)

(52) U.S. Cl. .................................... 370/312; 455/414.1
(58) Field of Classification Search .............. 455/414.1, 455/456.2, 404.1, 434, 503, 562.1, 522, 60; 370/312, 465, 329, 338; 705/3, 26, 9
See application file for complete search history.

(56) References Cited

U.S. PATENT DOCUMENTS

| | | | |
|---|---|---|---|
| 2004/0230370 A1* | 11/2004 | Tzamaloukas | 701/200 |
| 2005/0276243 A1* | 12/2005 | Sugaya et al. | 370/328 |
| 2006/0268816 A1* | 11/2006 | Adachi et al. | 370/347 |
| 2007/0030824 A1* | 2/2007 | Ribaudo et al. | 370/328 |
| 2008/0144569 A1* | 6/2008 | Orlassino et al. | 370/329 |

* cited by examiner

*Primary Examiner*—Melody Mehrpour
(74) *Attorney, Agent, or Firm*—Blakely, Sokoloff, Taylor & Zafman LLP (57) ABSTRACT

An ad-hoc wireless network is disrupted by first obtaining a beacon or data frame sent by a station. The beacon or data frame is then examined to determine whether the station that sent the beacon or data frame is operating in an ad-hoc mode on the ad-hoc wireless network. If the station is determined to be operating in an ad-hoc mode, then a blocking frame, which is a beacon frame, is sent on the ad-hoc wireless network to disrupt the ad-hoc wireless network by changing the operational characteristic of the ad-hoc wireless network.

26 Claims, 3 Drawing Sheets

DISRUPTING AN AD-HOC WIRELESS NETWORK

BACKGROUND

1. Field

The present application generally relates to wireless local area networks. More particularly, the present application relates to disrupting an ad-hoc wireless network.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

In accordance with the current IEEE 802.11 standard, a WLAN can operate in two modes: infrastructure mode and ad-hoc mode. In an infrastructure mode, a station must authenticate and associate with an access point in the WLAN before obtaining service from the access point in order to communicate with another station on the WLAN. Thus, the access point operates as a hub for stations in the WLAN.

In an ad-hoc mode, a station can communicate with another station on the WLAN without authenticating or associating with an access point. Thus, two or more stations can communicate on a peer-to-peer basis. For the sake of convenience, when a WLAN operates in an ad-hoc mode, the WLAN will be referred to herein as an ad-hoc wireless network.

An ad-hoc wireless network has the advantage of being relatively inexpensive to operate as no access point is required. It may be desirable, however, in some applications to prevent stations from communicating through an ad-hoc wireless network. For example, in a classroom environment, it may be desirable to prevent students from communicating with one another through an ad-hoc wireless network.

SUMMARY

In one exemplary embodiment, an ad-hoc wireless network is disrupted by first obtaining a beacon or data frame sent by a station. The obtained beacon or data frame is then examined to determine whether the station that sent the beacon or data frame is operating in an ad-hoc mode on the ad-hoc wireless network. If the station is determined to be operating in an ad-hoc mode, then a blocking frame, which is a beacon frame, is sent on the ad-hoc wireless network to disrupt the ad-hoc wireless network by changing the operational characteristic of the ad-hoc wireless network.

DESCRIPTION OF THE DRAWING FIGURES

The present application can be best understood by reference to the following detailed description taken in conjunction with the accompanying drawing figures, in which like parts may be referred to by like numerals.

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

In a WLAN, a station is a component that can be used to connect to the WLAN, which can be mobile, portable, stationary, and the like, and can be referred to as the network adapter or network interface card. For instance, a station can be a desktop computer, a laptop computer, a personal digital assistant, and the like.

Figure 1:
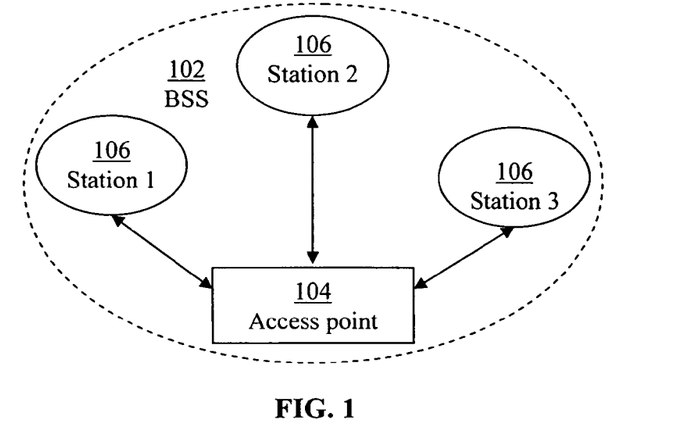
FIG. 1 depicts an exemplary basic service set of a WLAN operating in an infrastructure mode.

As described above, a WLAN can operate in an infrastructure mode. FIG. 1 depicts an exemplary basic service set ("BSS") 102 of a WLAN operating in an infrastructure mode. As depicted in FIG. 1, BSS 102 includes an access point ("AP") 104 that acts as a hub to facilitate communication between two or more stations 106 (e.g., station 1, station 2, and station 3) in BSS 102. Two or more BSSs 102 are referred to as an extended service set ("ESS"). The term ESS has also come to refer to the WLAN operating in an infrastructure mode. According to the current IEEE 802.11 standard, a basic service set identification address ("BSSID") is used to uniquely identify a BSS.

Under the current IEEE 802.11 standard, when a WLAN operates in an infrastructure mode, a station 106 must be authenticated to and associated with AP 104 in order to become a part of BSS 102 and receive service from AP 104. Once a station 106 is authenticated to and associated with AP 104, the station 106 can communicate with another station 106 in the WLAN through AP 104. The station 106 can be authenticated to different APs 104 simultaneously, but can only be associated with one AP 104 at any time.

In particular, a station 106 can send a message having a source address, a basic service set identification address ("BSSID"), and a destination address, to its associated AP 104. The AP 104 can then distribute the message to the station 106 specified as the destination address in the message. This destination address can specify a station 106 in the same BSS 102, or in another BSS 102 that is linked to the AP 104 through a distribution system.

Figure 2:
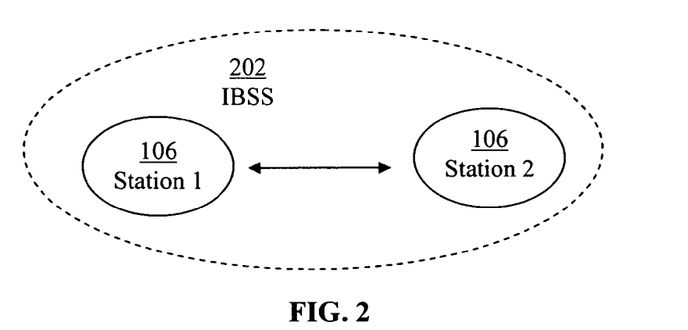
FIG. 2 depicts an exemplary independent basic service set of a WLAN operating in an ad-hoc mode.

As also described above, a WLAN can operate in an ad-hoc mode. FIG. 2 depicts an exemplary independent basic service set ("IBSS") 202 of a WLAN operating in an ad-hoc mode. As depicted in FIG. 2, IBSS 202 includes two or more stations 106 (e.g., station 1 and station 2) communicating through an ad-hoc wireless network. Thus, IBSS 202 is a BSS where stations 106 communicate without an AP. The term IBSS has come to refer to the WLAN operating in an ad-hoc mode. According to the current IEEE 802.11 standard, a BSSID is also used to uniquely identify an IBSS.

As described above, it may be desirable in some applications to prevent stations 106 from communicating through an ad-hoc wireless network. The example provided above was of a classroom where it may be desirable to prevent students from communicating with one another through an ad-hoc wireless network. It should be recognized, however, that there are various reasons for wanting to disrupt an ad-hoc wireless network.

Figure 3:
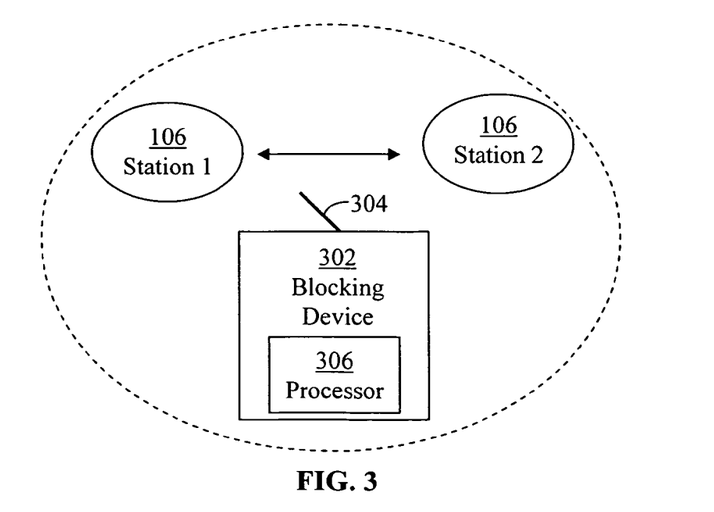
FIG. 3 depicts an exemplary blocking device located within the exemplary independent basic service set depicted in FIG. 2.

With reference to FIG. 3, in one exemplary embodiment, a blocking device 302 is used to disrupt an ad-hoc wireless network. In particular, as depicted in FIG. 3, blocking device 302 is located within a BSS. Note that the BSS may be later determined to have actually been an IBSS.

Blocking device 302 can be located in the BSS or IBSS such that blocking device 302 can receive transmissions sent from and received by stations 106 in the BSS or IBSS. Note that blocking device 302 need not necessarily be physically adjacent stations 106. Instead, blocking device 302 can be sufficiently near stations 106 such that the reception range of blocking device 302 covers stations 106 in the BSS or IBSS to be monitored.

Blocking device 302 can be a station or an AP in the WLAN. Additionally, blocking device 302 can be mobile, portable, stationary, and the like. For instance, blocking device 302 can be a desktop computer, a laptop computer, a personal digital assistant, and the like. In addition, blocking device 302 can be used by a user as a diagnostic tool, by an administrator as an administrative tool, and the like, to monitor the WLAN.

Figure 4:
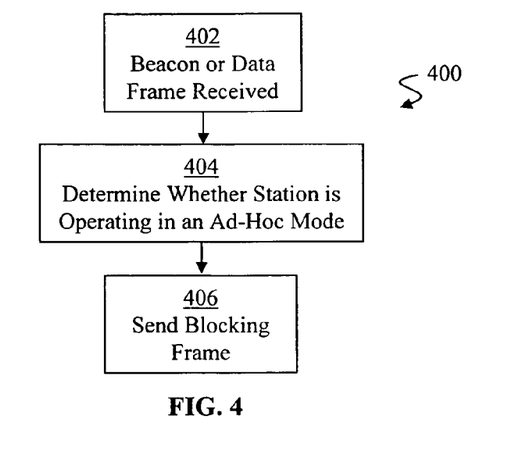
FIG. 4 depicts an exemplary process of disrupting an ad-hoc wireless network.

With reference to FIG. 4, an exemplary process 400 of disrupting an ad-hoc wireless network is depicted. It should be recognized that exemplary process 400 can be performed by blocking device 302 depicted in FIG. 3. It should also be recognized that exemplary process 400 can be performed using software, hardware, or a combination of software and hardware installed on blocking device 302 (FIG. 3).

A computer-readable storage medium containing computer executable code to disrupt an ad-hoc wireless network by instructing a processor or computer to operate as follows: a) obtaining a beacon or data frame sent by a station; b) examining the beacon or data frame to determine whether the station that sent the beacon or data frame is operating in an ad-hoc mode on the ad-hoc wireless network, the beacon or data frame having a first data associated with an operational characteristic of the ad-hoc wireless network; and c) if the station is determined to be operating in the ad-hoc mode in b), sending a blocking frame having a second data associated with the operational characteristic on the ad-hoc wireless network to disrupt the ad-hoc wireless network, wherein the second data is set by changing the first data associated with the operational characteristic of the ad-hoc wireless network, wherein the blocking frame is a beacon frame.

As depicted in FIG. 4, in step 402, a beacon or data frame sent by a station is received. In particular, with reference to FIG. 3, blocking device 302 can initially receive frames being transmitted within the BSS or IBSS in which it is located. Blocking device 302 can examine the received frames to identify the received frames as being beacon or data frames. It should be recognized that the process of examining a frame and identifying the frame as being a beacon or data frame is well known to one skilled in the art.

In one exemplary embodiment, if a received frame is identified as being neither a beacon or data frame, the received frame is disregarded (i.e., the received frame is not further processed in exemplary process 400). Thus, the identifying process described above can function as a filtering process whereby any received frames that are not beacon or data frames are disregarded. In this manner, step 404 of exemplary process 400 is only performed if the received frame is a beacon or data frame.

In one exemplary embodiment, blocking device 302 can receive several frames transmitted within the BSS or IBSS in advance of examining them. The received frames can be stored or buffered as they are received. The stored or buffered frames can be subsequently retrieved from where they were stored or buffered and examined to determine if the frames are beacon or data frames.

Blocking device 302 can receive transmissions over the WLAN by scanning the available channels in the WLAN. Alternatively, specific channels can be selected to be scanned. The number of available channels can vary depending on the country. For example, in the US a total of 11 channels are used, in Europe a total of 13 channels are used, and in Japan a total of 14 channels are used.

With reference to FIG. 4, in step 404, the received beacon or data frame is obtained and examined to determine whether the station that sent the beacon or data frame is operating in an ad-hoc mode on an ad-hoc wireless network. As will be described in more detail below, the examination processes for a beacon frame and a data frame are different. Thus, in one exemplary embodiment, the appropriate process can be performed after determining whether a beacon frame or a data frame is to be examined.

Figure 5A:
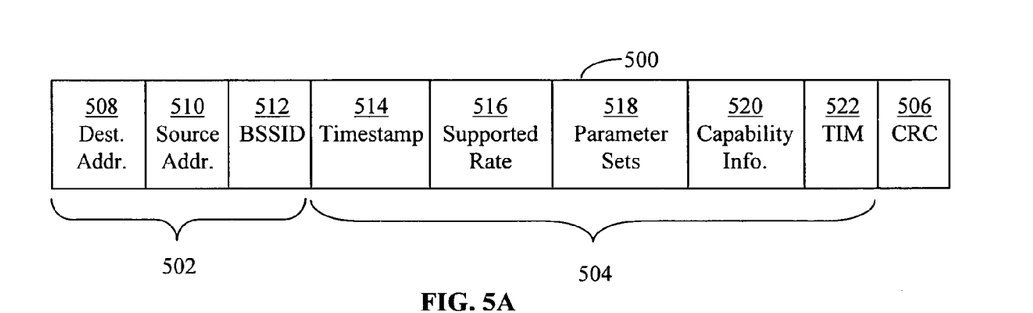
FIG. 5A depicts an exemplary beacon frame.
Figure 5B:
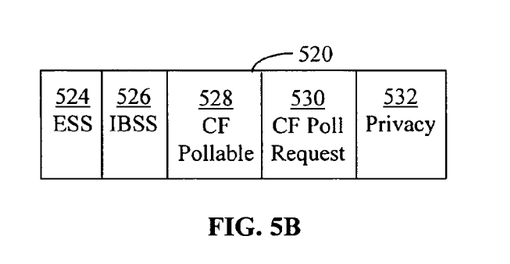
FIG. 5B depicts subfields in the exemplary beacon frame depicted in FIG. 5A.

With reference to FIG. 5A, assume the received frame is a beacon frame 500. As depicted in FIG. 5A, in accordance with the current 802.11 standard, beacon frame 500 includes a header portion 502, a body portion 504, and a cyclic redundancy checking (CRC) portion 506. Header portion 502 of beacon frame 500 includes a destination address field 508, a source address field 510, and a BSSID field 512. Body portion 504 includes a timestamp field 514, a supported rates field 516, a parameter sets field 518, a capability information field 520, and a traffic indication map (TIM) field 522. As also depicted in FIG. 5B, in accordance with the current 802.11 standard, capability information field 520 includes an ESS subfield 524, an IBSS subfield 526, a CF pollable subfield 528, a CF pollable request subfield 530, and a privacy subfield 532. It should be recognized that beacon frame 500 can include additional fields and subfields not depicted in FIGS. 5A and 5B.

In the present exemplary embodiment, if ESS subfield 524 is zero and IBSS subfield 526 is one, then the station that sent beacon frame 500 is determined to be operating in an ad-hoc mode in an ad-hoc wireless network. Additionally, the BSSID of the ad-hoc wireless network used to send beacon frame 500 can be obtained from BSSID field 512 of beacon frame 500.

Figure 6A:
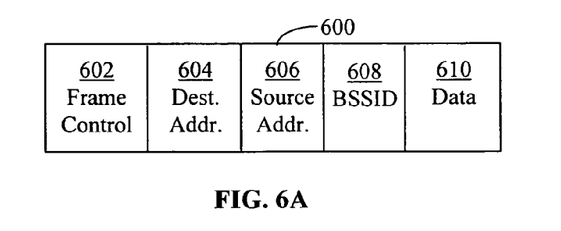
FIG. 6A depicts an exemplary data frame.
Figure 6B:
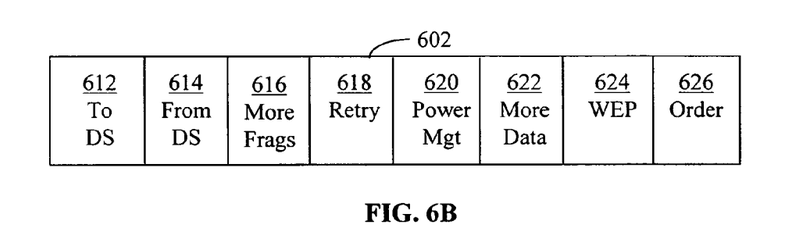
FIG. 6B depicts subfields in the exemplary data frame depicted in FIG. 6A.

With reference to FIG. 6A, now assume that the received frame is a data frame 600. As depicted in FIG. 6A, in accordance with the current 802.11 standard, data frame 600 includes a frame control field 602, a destination address field 604, a source address field 606, a BSSID field 608, and a data field 610. As depicted in FIG. 6B, in accordance with the current 802.11 standard, frame control field 602 includes a "To DS" subfield 612, a "From DS" subfield 614, a "More Fragments" subfield 616, a retry subfield 618, a power management subfield 620, a "More Data" subfield 622, a WEP subfield 624, and an order subfield 626.

In the present exemplary embodiment, if "To DS" subfield 612 and "From DS" subfield 614 of frame control field 602 are both zero (0), then the station that sent data frame 600 is determined to be operating in an ad-hoc mode in an ad-hoc wireless network. Additionally, the BSSID of the ad-hoc wireless network used to send data frame 600 can be obtained from BSSID field 608 of data frame 600.

Figure 7:
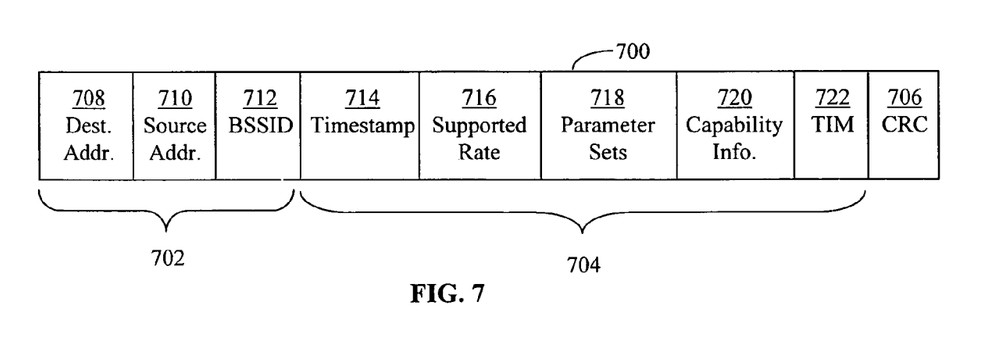
FIG. 7 depicts an exemplary blocking frame, which is a beacon frame.

With reference to FIG. 4, in step 406, if the station is determined to be operating in an ad-hoc mode in step 404, then a blocking frame is sent on the ad-hoc wireless network to disrupt the ad-hoc wireless network by changing the operational characteristic of the ad-hoc wireless network. As depicted in FIG. 7, in the present exemplary embodiment, the blocking frame is a beacon frame 700, which is sent on the ad-hoc network identified in the BSSID field of the received beacon or data frame.

As depicted in FIG. 7, in accordance with the current 802.11 standard, similar to beacon frame 500 (FIG. 5A), beacon frame 700 includes a header portion 702, a body portion 704, and a cyclic redundancy checking (CRC) portion 706. Header portion 702 of beacon frame 700 includes a destination address field 708, a source address field 710, and a BSSID field 712. Body portion 704 includes a timestamp field 714, a supported rates field 716, a parameter set field 718, a capability information field 720, and a traffic indication map (TIM) field 722.

In one exemplary embodiment, the blocking frame is sent as a unicast frame only to the station on the ad-hoc wireless network that sent the received beacon or data frame. In particular, with reference to FIG. 3, assume station 1 sent a beacon or data frame that was received by blocking device 302. After the beacon or data frame is examined by blocking device 302 and station 1 has been determined to be operating in an ad-hoc mode (in the present example, assume that station 1 is operating in an ad-hoc mode with station 2 in an ad-hoc wireless network established between station 1 and station 2), blocking device 302 sends a blocking frame as a unicast frame only to station 1. In particular, the received beacon or data frame can be examined to determine the source address of the beacon or data frame, which in the present example would be the address of station 1. The source address (i.e., the address of station 1 in the present example) can then be used as the destination address of the blocking frame (i.e., destination address field 708 of beacon frame 700 in FIG. 7).

In one exemplary embodiment, one or more stations determined to be operating in an ad-hoc mode in step 404 can be displayed to a user. The user can then specify the stations to be targeted to receive blocking frames. Blocking frames can then be sent as unicast frames to those targeted stations in step 406. Alternatively, blocking frames can be automatically send to any stations determined to be operating in an ad-hoc mode in step 404.

In one exemplary embodiment, the blocking frame is sent as a multicast or broadcast frame to all stations on the ad-hoc wireless network. In particular, with reference to FIG. 3, assume again that station 1 sent a beacon or data frame that was received by blocking device 302. Again, after the beacon or data frame is examined by blocking device 302 and station 1 has been determined to be operating in an ad-hoc mode, blocking device 302 sends a blocking frame as a multicast or broadcast frame that can be received by both station 1 and station 2. In particular, with reference to FIG. 7, destination address field 708 of beacon frame 700 is set to all ones, which is the broadcast address.

With reference again to FIG. 3, it should be recognized that blocking device 302 can send multiple blocking frames. It should also be recognized that blocking device 302 can send one or more blocking frames as unicast frames and one or more blocking frames as a multicast or broadcast frames. For example, referring again to FIG. 3, blocking device 302 can send one or more blocking frames as unicast frames only to station 1 and one or more blockings frames as multicast or broadcast frames that can be received by both station 1 and station 2.

In one exemplary embodiment, the blocking frame is sent, either as a unicast or multicast/broadcast frame, with source address field 710 (FIG. 7) set to a dynamically derived address, which is a valid 802.11 address. For example, the dynamically derived address can include the BSSID associated with the received beacon or data frame with the manufacturer part altered. One advantage of using the dynamically derived address as the source address is that the origin of the blocking frame (i.e., blocking device 302) cannot be derived from the dynamically derived address, which protects blocking device 302 from detection or attack.

As described above and as depicted in FIG. 7, the blocking frame sent by the blocking device includes timestamp field 714. In accordance with the 802.11 standard, timestamp field 714 is a 64 bit field with a range of values that corresponds to 47 days. In one exemplary embodiment, timestamp field 714 of the blocking frame (i.e., beacon frame 700) is set to a value that is at the high end of the possible range of values. The value should be large enough that it is within a period "n" of the timestamp reaching its maximum. This period "n" is the time within which sustained disruption of the network is required and is determined by the blocking device. One advantage to setting timestamp field 714 to a high value is that the blocking frame is more likely to be reviewed by the station that receives the blocking frame.

In one exemplary embodiment, a series of blocking frames is sent by the blocking device. In this exemplary embodiment, when the series of blocking frames is sent, the value of the timestamp fields of the blocking frames increases in a non-linear fashion. In contrast, in accordance with the 802.11 standard, the timestamp of subsequent frames increases in a linear fashion. One advantage of increasing the value of the timestamp field in a non-linear fashion is that the timestamp can quickly become recognized by receiving stations(s) as the latest, ensuring that the blocking frame is evaluated by the receiving station(s), in accordance with the 802.11 standard (section 11.1.2 of the current 802.11 specification).

In one exemplary embodiment, the value of the timestamp field of subsequently sent blocking frames is increased logarithmically. In another exemplary embodiment, the value is increased pseudo-randomly or randomly. One advantage of increasing the value of the timestamp pseudo-randomly or randomly is that it decreases the likelihood that a pattern can be detected in the manner in which the value of the timestamp field is being increased.

As described above and as depicted in FIG. 7, the blocking frame sent by the blocking device includes parameter set field 718. In accordance with the current 802.11 standard, parameter set field 702 includes a DS channel subfield. In one exemplary embodiment, the blocking frame is sent with the DS channel subfield set to a different channel than the specified DS channel of the received beacon frame. In this manner, the one or more stations currently operating in an ad-hoc mode in the ad-hoc network are forced to change the DS channel on which they operate, which can produce the desired disruption to the ad-hoc network.

In particular, when the beacon frame is received, a DS channel subfield in the beacon frame can be examined to determine the DS channel on which the beacon frame was sent. Additionally, by virtue of having received the beacon or data frame, the blocking device is aware of the DS channel on which the beacon frame or data frame was received and thus sent. In sending the blocking frame, the blocking device can specify a DS channel in the DS channel subfield that is different than the specified DS channel of the received beacon frame.

As described above, in one exemplary embodiment, a series of blocking frames are sent by the blocking device. In this exemplary embodiment, when the series of blocking frames are sent, the DS channel subfields of the blocking frames are set to different DS channels. Changing the DS channel in this manner increases the disruption likely to be caused on the ad-hoc network. Note that the DS channel can be changed in any desirable manner, such as sequentially, a mathematic pattern, pseudo-randomly, or randomly.

As described above and as depicted in FIG. 7, the blocking frame sent by the blocking device includes capability information field 720. In accordance with the current 802.11 standard, capability information field 720 includes a privacy subfield (see FIG. 5B). In one exemplary embodiment, the blocking frame is sent with the privacy subfield, which determines whether WEP encryption will be used, in capabilities information field 720 set to a different setting than the privacy subfield in the capabilities info field of the received beacon frame. In this manner, the one or more stations currently operating in an ad-hoc mode in the ad-hoc network are forced to change whether they use encryption, which can produce the desired disruption to the ad-hoc network.

As described above, in one exemplary embodiment, a series of blocking frames are sent by the blocking device. In this exemplary embodiment, when the series of blocking frames are sent, the privacy subfields of the subsequent blocking frames are set to different settings. Changing the privacy subfields in this manner increases the disruption likely to be caused on the ad-hoc network. Note that the privacy subfields can be changed in any desirable manner, such as alternating, a mathematic pattern, pseudo-randomly, or randomly.

As described above and as depicted in FIG. 7, the blocking frame sent by the blocking device includes supported rates field 716. In one exemplary embodiment, the blocking frame is sent with a supported rates field set to a different value than the supported rates field of the received beacon. In this manner, the one or more stations currently operating in an ad-hoc mode in the ad-hoc network are forced to change the supported rates, which can produce the desired disruption to the ad-hoc network.

As described above, in one exemplary embodiment, a series of blocking frames are sent by the blocking device. In this exemplary embodiment, when the series of blocking frames are sent, the supported rates fields of the subsequent blocking frames are set to different values. Changing the supported rates field in this manner increases the disruption likely to be caused on the ad-hoc network. Note that the value of the supported rates field can be changed in any desirable manner, such as linearly, non-linearly, pseudo-randomly, or randomly.

It should be recognized that in sending a series of blocking frames, one or more of the changes to the settings of the blockings frames described above can be made. In particular, in sending the series of blocking frames, the DS channel subfields of the blocking frames can be set to different channels, the privacy subfields of the blocking frames can be set to different settings, and/or the supported rates fields of the of the blocking frames can be set to different values.

Additionally, in sending the series of the blocking frames, the timestamp fields of the blocking frames can be set to a value that is at the high end of the possible range of values. Furthermore, the value of the timestamp fields of the blocking frames can be increased non-linearly as described above.

It should be recognized that while increasing the number of blocking frames can increase the effectiveness of the blocking frames in disrupting the ad-hoc network, it also can reduce the bandwidth of the wireless network. Thus, a balance is preferably achieved in selecting the number of blocking frames to be transmitted. For example, in one exemplary embodiment, the series of blocking frames are sent at a rate of about 3 packets per second when the blocking frames are sent as unicast frames. The series of blocking frames are sent at a rate of about 16 packets per second when the blocking frames are sent as broadcast frames.

Although the present application has described certain embodiments, examples, and applications, it will be apparent to those skilled in the art that various modifications and changes may be made without departing from the invention.

I claim:

1. A method of disrupting an ad-hoc wireless network, the method comprising:
   a) obtaining a beacon or data frame sent by a station;
   b) examining the beacon or data frame to determine whether the station that sent the beacon or data frame is operating in an ad-hoc mode on the ad-hoc wireless network, the beacon or data frame having a first data associated with an operational characteristic of the ad-hoc wireless network; and
   c) if the station is determined to be operating in the ad-hoc mode in b), sending a blocking frame having a second data associated with the operational characteristic on the ad-hoc wireless network to disrupt the ad-hoc wireless network, wherein the second data is set by changing the first data associated with the operational characteristic of the ad-hoc wireless network, wherein the blocking frame is a beacon frame.

2. The method of claim 1, further
comprising: receiving a frame sent by a station;
identifying whether the received frame is a beacon or data frame;
if the received frame is a beacon or data frame, performing steps a)-c) of claim 1 using the received frame as the beacon or data frame; and
if the received frame is not a beacon or data frame, disregarding the received frame and not performing steps a)-c) of claim 1 using the received frame as the beacon or data frame.

3. The method of claim 1, wherein b) comprises:
when a beacon frame is obtained in a), examining a capability information field in the beacon frame, wherein the capability information field includes a extended service set subfield and an independent basic service set subfield; and
if the extended service set subfield is a zero and the independent basic service set subfield is a one, determining that the station is operating in an ad-hoc mode in the ad-hoc wireless network.

4. The method of claim 1, wherein b) comprises:
when a data frame is obtained in a), examining a frame control field of the data frame, wherein the frame control field includes a To OS subfield and a From OS subfield; and
if the To OS subfield and the From DS subfield are both zero, then determining that the station is operating in an ad-hoc mode in the ad-hoc wireless network.

5. The method of claim 1, wherein the blocking frame is sent as a unicast frame only to the station on the ad-hoc wireless network that sent the beacon or data frame.

6. The method of claim 5, wherein c) further comprises:
if the station is determined to be operating in an ad-hoc mode in the ad-hoc wireless network, examining the beacon or data frame to determine source address of the beacon or data frame, and wherein the blocking frame includes a destination address, and wherein the blocking frame is sent with the destination address set to the determined source address of the beacon or data frame.

7. The method of claim 1, wherein the blocking frame is sent as a broadcast frame to all stations on the ad-hoc wireless network.

8. The method of claim 1, wherein sending a blocking frame comprises:
sending a first blocking frame as a unicast frame only to the station on the ad-hoc wireless network that sent the beacon or data frame; and
sending a second blocking frame as a broadcast frame to all stations on the ad-hoc wireless network.

9. The method of claim 1, wherein the blocking frame is sent with a timestamp field set to a high end of the possible range of values.

10. The method of claim 9, further comprising:
sending one or more subsequent blocking frames, wherein the values of the timestamp fields of the subsequent blocking frames increase non-linearly.

11. The method of claim 10, wherein the values of the timestamp fields of the subsequent blocking frames increase logarithmically.

12. The method of claim 10, wherein the values of the timestamp fields of the subsequent blocking frames increase pseudo-randomly or randomly.

13. The method of claim 1, wherein the beacon frame was sent on a specified OS channel, and
wherein the blocking frame is sent with an OS channel subfield set to a different channel than the specified OS channel of the beacon frame.

14. The method of claim 13, further comprising:
sending one or more subsequent blocking frames, wherein the DS channel subfields of the subsequent blocking frames are set to different channels.

15. The method of claim 1, wherein the beacon frame was sent with a privacy subfield set on or off, wherein the blocking frame is sent with a privacy subfield set different than the beacon frame.

16. The method of claim 15, further comprising:
sending one or more subsequent blocking frames, wherein the privacy subfields of the subsequent blocking frames are set to different settings.

17. The method of claim 1, wherein the beacon frame was sent with a supported rates field set to a value, wherein the blocking frame is sent with a supported rates field set to a different value than the beacon frame.

18. The method of claim 17, further comprising:
sending one or more subsequent blocking frames, wherein the supported rates fields of the subsequent blocking frames are set to different values.

19. The method of claim 1, wherein sending a blocking frame comprises:
sending a series of blocking frames, wherein the series of blocking frames are sent with one or more of the following settings to change the operational characteristic of the ad hoc wireless network:
OS channel subfields of the blocking frames set to different channels;
privacy subfields of the blocking frames set to different settings; and
supported rates fields of the blocking frames set to different values.

20. The method of claim 19, wherein the timestamp fields of the blocking frames are set to values high in the range of possible values, and wherein the values of the timestamp fields of the blocking frames increase non-linearly.

21. A computer-readable storage medium storing computer executable code to disrupt an ad-hoc wireless network by instructing a processor or computer to operate as follows:
a) obtaining a beacon or data frame sent by a station;
b) examining the beacon or data frame to determine whether the station that sent the beacon or data frame is operating in an ad-hoc mode on the ad-hoc wireless network, the beacon or data frame having a first data associated with an operational characteristic of the ad-hoc wireless network; and
c) if the station is determined to be operating in the ad-hoc mode in b), sending a blocking frame having a second data associated with the operational characteristic on the ad-hoc wireless network to disrupt the ad-hoc wireless network, wherein the second data is set by changing the first data associated with the operational characteristic of the ad-hoc wireless network, wherein the blocking frame is a beacon frame.

22. The computer-readable storage medium of claim 21, wherein sending a blocking frame comprises:
sending a series of blocking frames, wherein the series of blocking frames are sent with one or more of the following settings to change the operational characteristic of the ad-hoc wireless network:
OS channel subfields of the blocking frames set to different channels;
privacy subfields of the blocking frames set to different settings; and
supported rates fields of the blocking frames set to different values.

23. The computer-readable storage medium of claim 22, wherein the timestamp fields of the blocking frames are set to values high in the range of possible values, and wherein the values of the timestamp fields of the blocking frames increase non-linearly.

24. A blocking device for using in a wireless local area network to disrupt an ad-hoc wireless network, the blocking device comprising:
a wireless antenna configured to receive a beacon or data frame sent by a station; and a processor configured to:
examine the received beacon or data frame to determine whether the station that sent the beacon or data frame is operating in an ad-hoc mode on the ad-hoc wireless network, the beacon or data frame having a first operational characteristic of the ad-hoc wireless network; and
if the station is determined to be operating in the ad-hoc mode, send a blocking frame having a second data associated with the operational characteristic on the ad-hoc wireless network to disrupt the ad-hoc wireless network, wherein the second data is set by changing the first data associated with the operational characteristic of the ad-hoc wireless network, wherein the blocking frame is a beacon frame.

25. The blocking device of claim 24, wherein the blocking frame is sent by:
sending a series of blocking frames, wherein the series of blocking frames are sent with one or more of the following settings to change the operational characteristic of the ad-hoc wireless network:

OS channel subfields of the blocking frames set to different channels;
privacy subfields of the blocking frames set to different settings; and
supported rates fields of the blocking frames set to different values.

26. The blocking device of claim 25, wherein the timestamp fields of the blocking frames are set to values high in the range of possible values, and wherein the values of the timestamp fields of the blocking frames increase non-linearly.

* * * * *

UNITED STATES PATENT AND TRADEMARK OFFICE
CERTIFICATE OF CORRECTION

| | |
|---|---|
| PATENT NO. | : 7,596,109 B1 |
| APPLICATION NO. | : 11/303691 |
| DATED | : September 29, 2009 |
| INVENTOR(S) | : Ricardo Tomas Farrington |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

Twenty-eighth Day of September, 2010

David J. Kappos
*Director of the United States Patent and Trademark Office*